(12) United States Patent
Marinelli et al.

(10) Patent No.: US 6,167,609 B1
(45) Date of Patent: *Jan. 2, 2001

(54) ACID PRETREATMENT FOR ADHESIVE BONDING OF VEHICLE ASSEMBLIES

(75) Inventors: James M. Marinelli, Murrysville; Sherri F. McCleary; John V. Costrini, both of Apollo; Gary A. Nitowski, Lower Burrell; John T. Siemon, Cheswick, all of PA (US)

(73) Assignee: Aluminum Company of America, Pittsburgh, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,498

(22) Filed: Dec. 26, 1997

(51) Int. Cl.$^7$ .................................................. B21D 35/00
(52) U.S. Cl. ......................................... 29/469.5; 29/527.2
(58) Field of Search .............................. 29/897.2, 469.5, 29/527.2, 527.4, 527.3; 156/292, 316; 134/2, 3, 26, 28, 41; 510/436, 469

(56) References Cited

U.S. PATENT DOCUMENTS

| | | | |
|---|---|---|---|
| 3,220,832 | * | 11/1965 | Uhlig et al. ........................... 430/60 |
| 3,687,858 | * | 8/1972 | Geisler et al. ......................... 134/40 |
| 4,085,012 | * | 4/1978 | Marceau et al. ....................... 204/38 |
| 4,308,079 | * | 12/1981 | Venables et al. ............... 148/6.15 R |
| 4,382,825 | * | 5/1983 | McCready ................................ 134/2 |
| 4,540,444 | * | 9/1985 | Kelly ........................................ 134/3 |
| 4,778,533 | * | 10/1988 | Gregory et al. ....................... 134/29 |
| 4,924,057 | * | 5/1990 | Puddle et al. ........................ 219/118 |
| 5,026,612 | * | 6/1991 | Selwood et al. ..................... 428/594 |
| 5,059,258 | | 10/1991 | Wefers et al. . |
| 5,106,429 | * | 4/1992 | McAuliffe et al. ...................... 148/2 |
| 5,132,181 | * | 7/1992 | Wefers et al. ........................ 428/457 |
| 5,139,888 | * | 8/1992 | Selwood et al. ..................... 428/594 |
| 5,238,715 | * | 8/1993 | Wefers et al. ....................... 428/34.4 |
| 5,288,356 | * | 2/1994 | Benefiel .............................. 29/469.5 |
| 5,290,424 | * | 3/1994 | Mozelewski et al. ............... 205/116 |
| 5,382,295 | * | 1/1995 | Aoki et al. ............................... 134/2 |
| 5,389,138 | * | 2/1995 | Harry, Jr. ................................. 134/2 |
| 5,407,702 | * | 4/1995 | Smith et al. .......................... 427/211 |
| 5,463,804 | | 11/1995 | McCleary et al. . |
| 5,622,569 | * | 4/1997 | Dennis et al. ........................... 134/2 |
| 5,688,755 | | 11/1997 | Ikeda et al. . |

\* cited by examiner

Primary Examiner—Irene Cuda Rosenbaum
Assistant Examiner—Trinh T. Nguyen
(74) Attorney, Agent, or Firm—Glenn E. Klepac

(57) ABSTRACT

An aluminum alloy sheet, plate, casting or extrusion having a surface layer containing magnesium oxide and aluminum oxide is cleaned with an acidic solution. The cleaned component has an aluminum oxide layer that is pretreated with a phosphorus-containing organic acid to form a functionalized layer. A layer of polymeric adhesive is applied to the functionalized layer, and the adhesive layer is joined to a metal support structure to form a vehicle assembly.

12 Claims, 1 Drawing Sheet

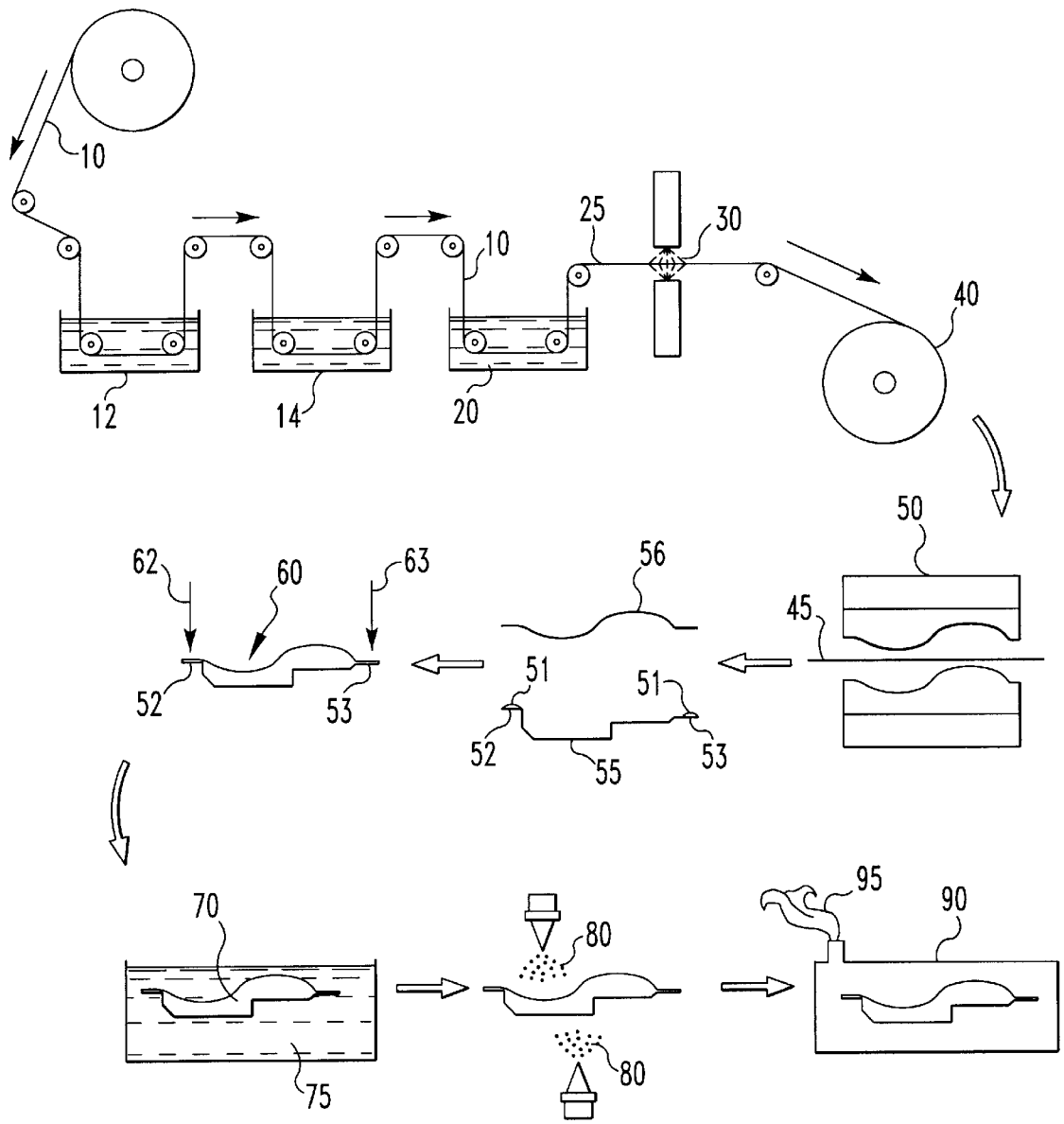

ACID PRETREATMENT FOR ADHESIVE BONDING OF VEHICLE ASSEMBLIES

FIELD OF THE INVENTION

The present invention relates to a method for joining aluminum alloy extrusions, castings, sheet and plate into structures suitable for use as vehicle components. More particularly, the invention concerns an improved method for pretreating aluminum alloy components to promote adhesive bonding.

BACKGROUND OF THE INVENTION

Aluminum alloy components are finding increased use in automotive and aircraft applications because they are light and have high strength. Vehicle manufacturers join the aluminum alloy components permanently with polymeric adhesives, or they join the components temporarily with adhesives before welding them. Some manufacturers employ chromium-containing chemicals to treat aluminum alloy surfaces in order to achieve durable adhesive bonds. Environmental concerns about hexavalent chromium are expected to render obsolete the chromium pretreatments.

The present invention relates to a non-chromium pretreatment for improving the adhesive bonding of aluminum alloy components. A prior art process for pretreating aluminum alloy sheet with chromium compounds is disclosed in Selwood U.S. Pat. Nos. 5,026,612 and 5,139,888. A nonchromate pretreatment process for aluminum alloy sheet is disclosed in McCleary U.S. Pat. No. 5,463,804, issued Nov. 7, 1995. The McCleary patent is incorporated herein by reference, to the extent consistent with the present invention.

The process of our invention is useful for treating aluminum alloy extrusions, castings, sheet and plate. As used herein, the term "sheet" refers to aluminum alloy material having a thickness of about 0.006 to 0.249 inch. The term "plate" refers to flat aluminum alloy material having a thickness of about 0.25 inch or more.

The primary criterion for evaluating the effectiveness of an aluminum alloy pretreatment is adhesive bond durability. It is also important that the surface treatment not be detrimental to downstream processes. For example, a sheet surface treatment must not inhibit stamping and forming the sheet. The surface treatment must remain intact during those operations. Resistance spot welding is often used in combination with adhesive bonding to improve peel strength. The pretreatment must not significantly reduce the quality of the welds or reduce the life expectancy of welding electrodes. It is also critical that the pretreatment not be detrimental to the chemical baths required for zinc phosphating and electrocoating before paint is applied.

A principal objective of the present invention is to provide a process for adhesively joining magnesium-containing aluminum alloy components.

A related objective of the invention is to provide a pretreatment for a heat treated aluminum alloy components that will improve adhesive bond durability.

Additional objectives and advantages of our invention will be readily apparent to persons skilled in the at from the following detailed description of a particularly preferred embodiment.

SUMMARY OF THE INVENTION

In accordance with the present invention, there is provided an improved process for adhesively bonding aluminum alloy components. As used herein, the term "aluminum alloy" refers to an alloy containing about 85 wt. % or more aluminum and one or more alloying elements that are not subversive to organophosphorus surface treatments. Some suitable alloying elements are copper, manganese, magnesium. silicon, zinc, and lithium. These alloying elements are sometimes called character imparting because alloys containing them derive their characteristic properties from such elements.

Usually, the amounts of such alloying elements are, as to each of magnesium, copper and zinc, about 0.5 to 10% by weight of the total alloy; as to the element manganese, usually about 0.15 to 2% of the total alloy; as to silicon, usually about 0.25 to 15% of the total alloy; and, as to the element lithium, about 0.2 to 3% of the total alloy. Iron and beryllium may also be present in aluminum alloys and can have a marked effect upon alloys containing them. Iron, for example, is often adjusted in amounts of about 0.3 to 2.0% by weight to perform specific functions and beryllium may be present in amounts of about 0.001 to 5.0% of the total alloy.

Various aluminum alloys available in sheet form are suitable for practice of the present invention, including alloys belonging to the AA2000, 3000, 5000, 6000 and 7000 series. Alloys of the AA6000 series containing about 0.4 to 1.5 wt. % magnesium and about 0.3 to 1.5 wt. % silicon are preferred. This group of alloys includes AA alloy 6022 containing 0.45–0.7 wt. % Mg, 0.8–1.5 wt. % Si, 0.01–0.11 wt. % Cu, and 0.02–0.10 wt. % Mn; and AA alloy 6111 containing 0.5–1.0% Mg, 0.7–1.1% Si, 0.50–0.90% Cu and 0.15–0.45% Mn. Another useful group of alloys is the AA5000 series. One preferred example is AA alloy 5182 which contains 4.0–5.0 wt. % Mg and 0.20–0.50 wt. % Mn.

Various aluminum alloy castings are suitable for practice of our invention, including die castings, sand castings and permanent mold castings. One suitable alloy is alloy number A356 with a nominal composition of 7.0 wt. % Si, 0.3 wt. % Mg, 0.17 wt. % max. Fe, 0.17 wt. % max. Cu, remainder aluminum, incidental elements, and impurities. The A356 alloy castings are commonly solution heat treated or aged at an elevated temperature before use. Two other useful alloys are C119 containing 9–10.5 wt. % Si, and 0.10–0.20 wt. % Mg; and C448 containing 9.0–11.5 wt. % Si, 0.40–0.80 wt. % Mn and 0.10–0.35 wt. % Mg.

Aluminum alloy extrusions suitable for practice of the invention are preferably made from alloys containing silicon and magnesium in proportions making them heat treatable, such as the AA6000 series of aluminum alloys. In particular, the AA6009, 6010, 6061, 6063 and similar alloys are useful. The AA6061 and 6063 aluminum alloys are particularly preferred. Other useful alloys include C210 containing 0.40–0.60 wt. % Si, 0.15–0.25 wt. % Cu, 0.40–0.60 wt. % Mg, and 0.15–0.25 wt. % Fe; and C461 containing 0.4–0.6 wt. % Si, 0.15–0.40 wt. % Fe, 0.45–0.70 wt. % Mg, and 0.10–0.25 wt. % V.

Aluminum alloy extrusions are typically made by a process wherein a heated ingot or billet is forced through a die opening under pressure to form an elongated body such as a channel or tube. The extruded product is generally forced through a die at forces in the 500 to 15,000 ton range. The extruded product is commonly solution heat treated and quenched after it leaves the extrusion die.

Heat treated aluminum alloy sheet, plate, extrusions, and castings are left with a surface layer comprising a mixture of metal oxides. Chemical composition of the surface layer will vary, depending upon the alloy. Typically, magnesium oxide predominates over aluminum oxide. The Mg:Al atomic ratio is generally about 1.5:1 to 3:1. The surface layer has a thickness of up to a few hundred angstroms.

We pretreat aluminum alloy sheet, plate, extrusions and castings with a phosphorus-containing organic acid before joining the pretreated body to a metal support structure, using a polymeric adhesive. In order to improve adhesion, the surface layer is treated with an acidic solution before applying the organic acid. The acidic solution is preferably an aqueous solution of one or more of phosphoric, sulfuric, nitric, and hydrofluoric acids, and mixtures thereof The solution generally has a pH of about 0–4. We rinse the acid treated surface layer with water. After surface preparation, a surface layer with reduced magnesium oxide content remains on the component.

We then pretreat the surface layer with a phosphorus-containing organic acid. The organic acid interacts with aluminum oxide in the surface layer to form a functionalized layer. The organic acid is dissolved in water, methanol, or other suitable organic solvent, to form a solution that is applied to the component by spraying, immersion, or roll coating. The phosphorus-containing organic acid may be an organophosphonic acid or an organophosphinic acid. The pretreated body is then rinsed with water after the pretreatment application step.

The term "organophosphonic acid" includes acids having the formula $R_m[PO(OH)_2]_n$ wherein R is an organic group containing 1–30 carbon atoms, m is the number of organic groups and is about 1–10, and n is the number of phosphonic acid groups and is about 1–10. Some suitable organophosphonic acids include vinyl phosphonic acid, methylphosphonic acid, ethylphosphonic acid, octylphosphonic acid and styrenephosphonic acid.

The term "organophosphinic acid" includes acids having the formula $R_m R'_o[PO(OH)]_n$ wherein R is an organic group containing 1–30 carbon atoms, R' is hydrogen or an organic group containing 1–30 carbon atoms, m is the number of R groups and is about 1–10, n is the number of phosphinic acid groups and is about 1–10, and o is the number of R' groups and is about 1–10. Some suitable organophosphinic acids include phenylphosphinic acid and bis-(perfluoroheptyl) phosphinic acid.

A particularly preferred vinyl phosphonic acid surface treatment forms essentially a monolayer with aluminum oxide in the surface layer. The coating weight is less than about 15 $mg/m^2$, and only about 3 $mg/m^2$ in a particularly preferred example.

An advantage of the present invention is that our organic surface pretreatment contains less than about 1 wt. % chromium and preferably essentially no chromium. Accordingly, environmental concerns associated with prior art chromate conversion coatings are eliminated.

The pretreated aluminum alloy sheet material is cut in desired sizes and shapes and then worked into a predetermined configuration. Castings, extrusions and plate may also require sizing, for example by machining, grinding or other milling process. Shaped assemblies made in accordance with the invention are suitable for many components of vehicles, including automotive bodies, doors, trunk decks and hood lids.

In manufacturing such automotive components, it is often necessary to join the pretreated sheet material to an adjacent structural member. Such members are preferably extruded aluminum alloy structural members. Optionally, the structural members may be aluminum alloy sheet, plate or castings. Joining pretreated aluminum sheet to such members is usually accomplished in two steps. First, a polymeric adhesive layer is applied to the pretreated component and the pretreated component is pressed against or into a second pretreated component.

The polymeric adhesive may be an epoxy, a polyurethane or an aciylic, with epoxies being particularly preferred.

After the adhesive is applied, the pretreated components are preferably spot welded together, preferably in a joint area of applied adhesive. Spot welding increases peel strength of the assembly and facilitates handling during the time interval before the adhesive is completely cured. If desired, curing of the adhesive may be accelerated by heating the assembly to an elevated temperature.

The assembly is preferably then passed through a zinc phosphate bath, dried, electrocoated, and subsequently painted with an appropriate finish.

BRIEF DESCRIPTION OF THE DRAWING

The sole FIGURE is a schematic diagram of a process for joining an aluminum alloy sheet to a metal support structure in accordance with the present invention.

DETAILED DESCRIPTION OF PREFERRED EMBODIMENTS

Aluminum alloy components to be treated in accordance with the present invention may be provided as sheet, plate, extrusions or castings. As shown in the FIGURE, a preferred method starts with 6111-T4 or 6022-T4 aluminum alloy sheet 10 from a rolling mill (not shown). The sheet 10 includes an oxide surface layer having a thickness of about 100 angstroms, as measured by Auger depth profiling. The Mg/Al atomic ratio is about 1.5, as measured by X-ray photoelectron spectroscopy (XPS).

The sheet 10 is immersed in an acid bath 12 containing phosphoric acid at a concentration of about 4 vol. %. The acid dissolves magnesium and aluminum oxides from the sheet surface layer. The acid-treated sheet is immediately rinsed in a water bath 14. Oxide particles removed from the sheet 10 are deposited in both baths 12, 14. The acid-treated sheet has an oxide surface layer thickness of about 55 angstroms. The Mg/Al atomic ratio is about 0.20.

The sheet 10 is next passed through an aqueous pretreatment bath 20 containing dissolved vinyl phosphonic acid. The vinyl phosphonic acid interacts with aluminum oxide in the surface layer to form a functionalized layer on the sheet 10. The treated sheet 25 may then be prelubricated with an organic lubricant 30 before it is coiled into a sheet roll 40.

The treated sheet 25 is cut into measured pieces 45 that are shaped in a stamping press 50. An epoxy adhesive 51 is applied to joint areas 52 53 of a shape 55 which is then bonded adhesively to an adjacent metal support structure 56. The support structure 56 is preferably an aluminum alloy casting or extrusion. The shape 55 and support structure 56 comprise an adhesively-joined assembly 60 that is passed to a welding station where weld electrodes 62, 63 apply spot welds in joint areas 52, 53.

The welded assembly 70 is coated with zinc phosphate in a bath 75. The assembly 70 is then electrocoated and subsequently painted with a polymeric coating 80. The painted assembly 70 is heated to an elevated temperature in an oven 90 to cure the adhesive joints and to remove any organic solvent remaining from the adhesive or paint as offgas 95.

Tests were performed on several aluminum alloy components of different alloy compositions to determine the effect of a deoxidizing acid surface preparation. Oxide thickness was measured by Auger depth profiling, before and after acid treatment. Contents of Mg and Al were measured by X-ray photoelectron spectroscopy. Results are shown in Table 1.

TABLE 1

| Alloy/Product Form | Mg | Al | Mg/Al | Oxide Thickness (angstroms) |
|---|---|---|---|---|
| 6022 sheet as received | 16.4 | 11.2 | 1.5 | 100 |
| 6022 sheet after deoxidization | 4.5 | 22.8 | 0.20 | 55 |
| 6111 sheet as received | 19.9 | 9.4 | 2.1 | 90 |
| 6111 sheet after deoxidization | 5.7 | 23.2 | 0.24 | 57 |
| 6061 extrusion as received | 16.8 | 6.2 | 2.7 | 33 |
| 6061 extrusion after deoxidization | 2.6 | 16.2 | 0.16 | 36 |
| A356 sand casting as received | 23.7 | 9.8 | 2.4 | 330 |
| A356 sand casting after deoxidization | 3.4 | 11.8 | 0.29 | 51 |

Having described the presently preferred embodiments, it is to be understood that the invention may be otherwise embodied within the scope of the appended claims.

What is claimed is:

1. A method for joining an aluminum alloy body to a metal support structure to form a vehicle assembly, comprising:
   (a) providing an aluminum alloy body comprising an aluminum alloy containing magnesium and having a surface layer comprising magnesium oxide and aluminum oxide;
   (b) cleaning said surface layer of the body with an acidic solution to dissolve said magnesium oxide, said acidic solution containing an acid selected from the group consisting of phosphoric, sulfuric, nitric, and hydrofluoric acids, and mixtures thereof;
   (c) interacting aluminum oxide in the surface layer with a phosphorus-containing organic acid to form a functionalized layer;
   (d) applying a layer of polymeric adhesive to the functionalized layer; and
   (e) joining the layer of polymeric adhesive to a metal support structure to form a vehicle assembly comprising said metal support structure and said aluminum alloy body.

2. The method of claim 1 further comprising:
   (f) sizing said aluminum alloy body after step (c) to form an aluminum alloy component.

3. The method of claim 1 wherein said acidic solution has a pH of about 0–4.

4. The method of claim 1 further comprising:
   (g) rinsing the acid cleaned surface portion layer with water after step (b) and before step (c).

5. The method of claim 1 further comprising:
   (g') heat treating said aluminum alloy body before step (a).

6. The method of claim 1 wherein said phosphorus-containing organic acid is selected from the group consisting of:
   (i) organophosphonic acids having the formula $R_m[PO(OH)_2]_n$ wherein R is an organic group containing 1–30 carbon atoms, m is the number of organic groups and is about 1–10, and n is the number of phosphonic acid groups and is about 1–10;
   (ii) organophosphinic acids having the formula $R_mR'_o[PO(OH)]_n$ wherein R is defined above, R' is hydrogen or an organic group containing 1–30 carbon atoms, m is the number of R groups, n is the number of phosphinic acid groups and o is the number of R' groups in the molecule; and
   (iii) mixtures of said organophosphonic and organophosphinic acids.

7. The method of claim 1 wherein said phosphorus-containing organic acid comprises vinyl phosphonic acid.

8. The method of claim 1 wherein said adhesive is selected from epoxy, polyurethane and acrylic adhesives.

9. The method of claim 1 further comprising:
   (g") welding said aluminum alloy body to said metal support structure.

10. The method of claim 1 wherein said aluminum alloy body comprises a body selected from the group consisting of extrusions, castings, sheet, and plate.

11. The method of claim 1 further comprising:
    (g''') rinsing the body with water after step (c).

12. A method for joining an aluminum alloy body to a metal support structure to form a vehicle assembly, comprising:
    (a) providing an aluminum alloy body comprising an aluminum alloy containing magnesium and having a surface layer comprising aluminum oxide and magnesium oxide;
    (b) cleaning said surface layer of the body with an acidic solution having a pH of 0–4, to dissolve said magnesium oxide;
    (c) interacting aluminum oxide in the surface layer with an organophosphonic acid or an organophosphinic acid to form a functionalized layer;
    (d) applying a layer of polymeric adhesive to the functionalized layer; and
    (e) joining the layer of polymeric adhesive to a metal support structure to form a vehicle assembly comprising said metal support structure and said aluminum alloy body.

* * * * *